(Model.)

3 Sheets—Sheet 1.

T. A. FORD.
GRAIN DRILL AND FERTILIZER DISTRIBUTER.

No. 247,627. Patented Sept. 27, 1881.

Witnesses:
M. M. Lacey
A. Parker.

Inventor:
Tilghman A. Ford
By R. S. & A. P. Lacey, Att'ys.

(Model.)  3 Sheets—Sheet 2.
T. A. FORD.
GRAIN DRILL AND FERTILIZER DISTRIBUTER.
No. 247,627.  Patented Sept. 27, 1881.
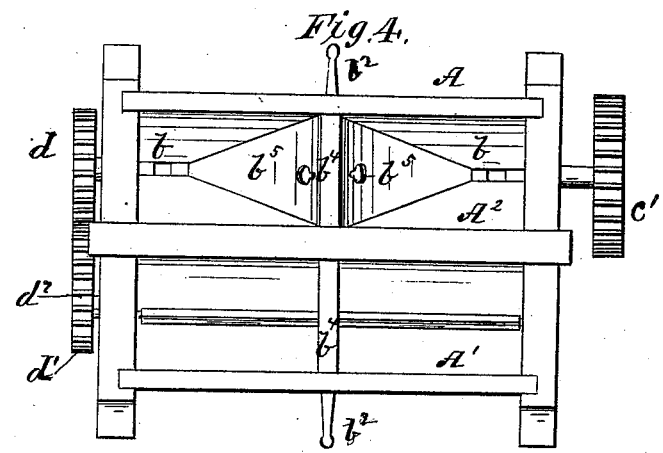
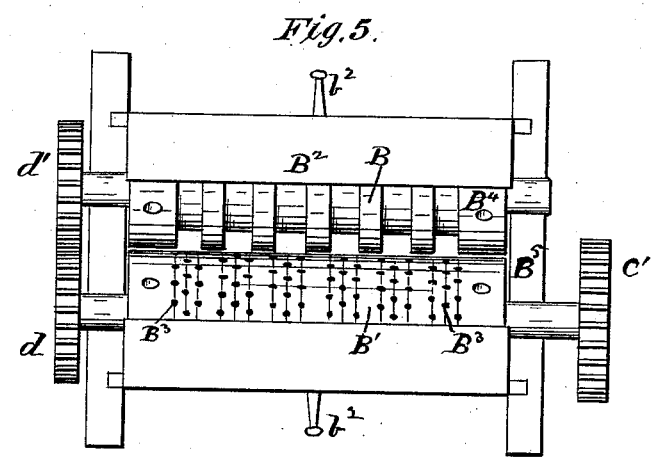
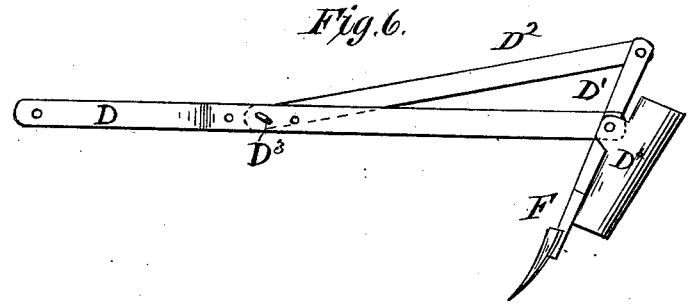
Witnesses:
M. M. Lacey
H. Parker
Inventor:
Tilghman A. Ford
By R. S. & A. F. Lacey
Att'ys.
N. PETERS. Photo-Lithographer, Washington, D. C.

(Model.)

T. A. FORD.

GRAIN DRILL AND FERTILIZER DISTRIBUTER.

No. 247,627. Patented Sept. 27, 1881.

3 Sheets—Sheet 3.

Witnesses:
A. Parker
B. Coventry

Inventor
Tilghman A. Ford
By R. S. & A. P. Lacey Attys

UNITED STATES PATENT OFFICE.

TILGHMAN A. FORD, OF RHEATOWN, TENNESSEE.

GRAIN-DRILL AND FERTILIZER-DISTRIBUTER.

SPECIFICATION forming part of Letters Patent No. 247,627, dated September 27, 1881.

Application filed April 23, 1881. (Model.)

*To all whom it may concern:*

Be it known that I, TILGHMAN A. FORD, a citizen of the United States, residing at Rheatown, in the county of Greene and State of Tennessee, have invented certain new and useful Improvements in Grain-Drills and Fertilizer-Distributers; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a new and improved combined seeding and fertilizing machine.

It consists in the construction and arrangement of the feed-rollers with reference to each other and to the grain and fertilizer boxes and the discharge-spouts, and in the novel construction of the drilling-shovels and boots, as hereinafter fully explained.

Figure 1:
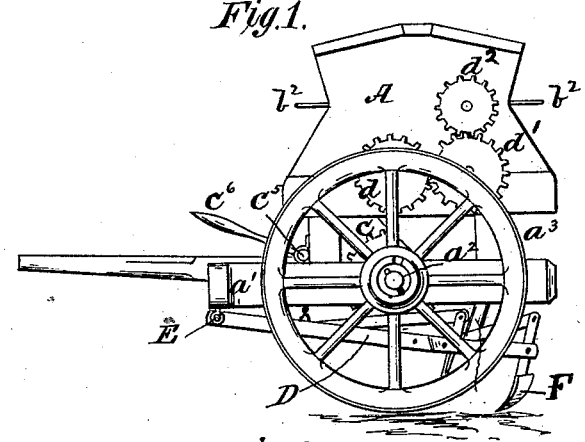
Figure 2:
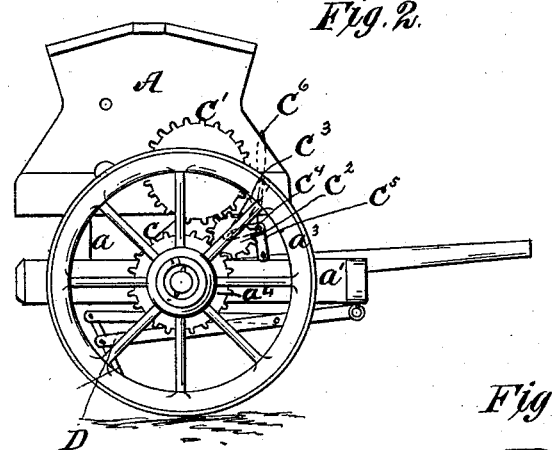
Figure 3:
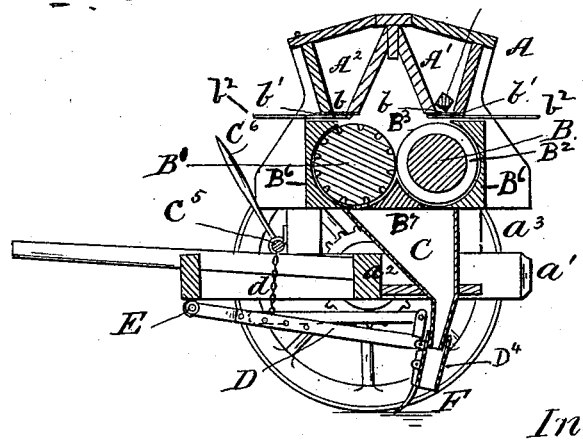
Figure 7:
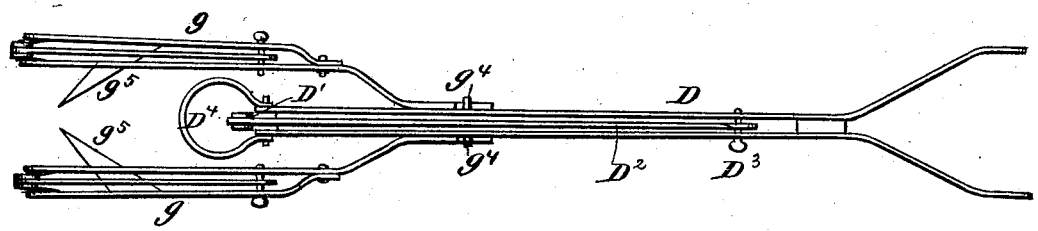
Figure 8:
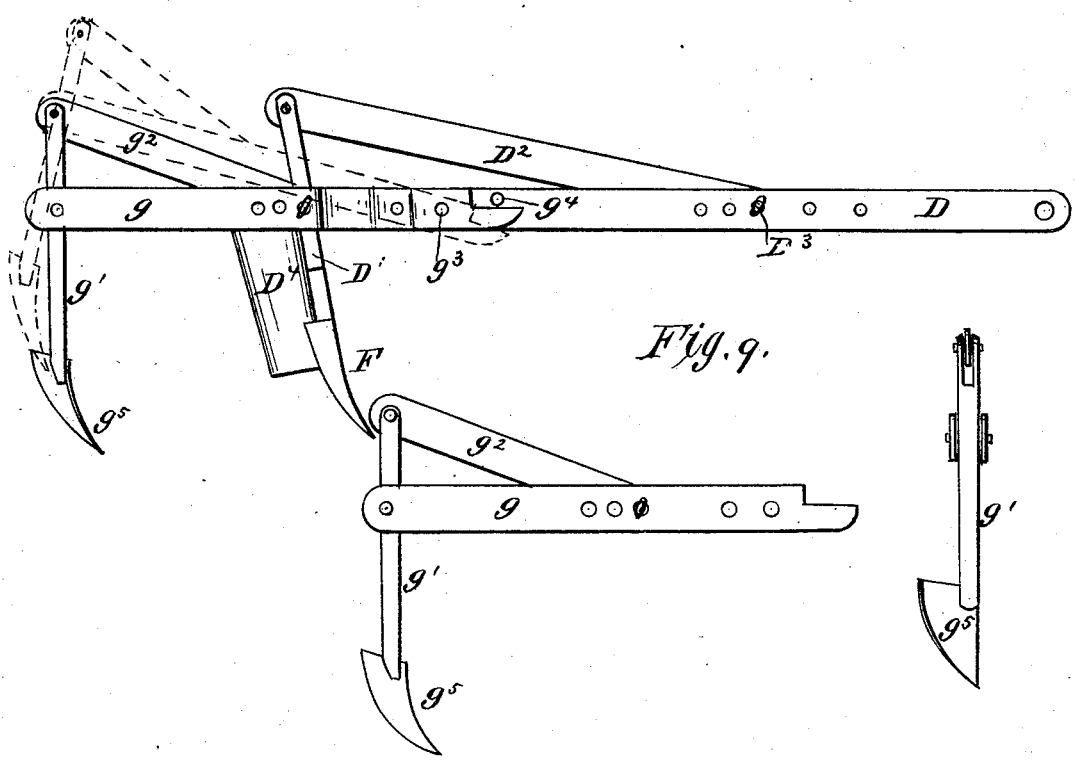
Figure 9:

In the drawings, Figure 1 is an end elevation. Fig. 2 is an elevation of the end opposite to the end shown in Fig. 1. Fig. 3 is a vertical section. Fig. 4 is a plan, and Fig. 5 is a plan of the feed-rollers, the grain and fertilizer boxes being removed. Fig. 6 shows a detail of a beam and shovel with drill-tooth attached thereto. Fig. 7 is a plan of my improved drilling-shovels and boot. Fig. 8 is a side elevation of the same, and Fig. 9 is a detail view of one of the supplemental shovels.

A is a casing, within which are formed the two hoppers $A'$ and $A^2$, and within which are placed the feed-rollers B B'. The hopper $A'$ is intended to hold the fertilizing material, and has in its lower end the agitator $b^3$. Each hopper has a length a little less than the distance between the wheels, and is divided into two compartments by a middle partition, $b^4$. In each compartment I employ an inclined board, $b^5$, one end of which rests against and near the top of the partition $b^4$, while the other end reaches nearly to the outer end of the compartment and covers all the openings $b\ b$, except one at the outer end of the hopper. I have shown the inclined boards in the hopper $A^2$ only; but it will be understood that they are to be used in the hopper $A'$ when the machine is employed in dropping or drilling corn in two rows. The agitator is revolved by a gear-wheel, $d^2$, fixed on one of its ends and outside the casing. The opening $b$ in the bottoms of the hoppers may be closed partially or wholly by slides $b'$ operated by handles $b^2$.

Immediately below the seed-openings $b\ b$ in the bottoms of the hoppers $A'\ A^2$, I place the feed-rollers B B'. The rollers are journaled in the casing A, and have on the ends of their shafts the gears $d\ d'$, which mesh together. In the operation of the machine the gears $d\ d'$ revolve in opposite directions and cause the roller B to revolve from the top toward the rear and the roller $B'$ to revolve from the top toward the front, thus carrying the grain and fertilizer in opposite directions after being received from the hoppers. The rollers are journaled in the casing, so that their peripheries touch each other. They are so arranged that the seed-openings of the hopper $A'$ will be in the rear of a vertical line drawn through the center of motion of the roller B, and the seed-openings of the hopper $A^2$ will be slightly in advance of a vertical line drawn through the center of motion of the roller $B'$. By this arrangement the grain and fertilizing material will drop onto, and each by its own gravity will take the direction of the revolution of, the roller which conveys it to the delivery-spout.

The roller B is constructed with a series of circumferential grooves or channels, $B^2$, which receive the fertilizer from the openings $b$ in the bottom of the hopper $A'$. The number of circumferential channels correspond to the number of openings $b$ in said box $A'$.

The roller $B'$ is provided with a series of seed-openings, $B^3$, arranged in circumferential rows and in sets of three rows, as shown. The openings in each row alternate in position with the openings in the adjacent row, and each set of three rows is arranged to be opposite one of the circumferential channels $B^2$ in the roller B. The series of rows of alternating openings $B^3$ secures an even distribution and regular flow of the seed, and being immediately opposite to and acting simultaneously with the fertilizer-distributing channels $B^2$, there is thereby secured an even and perfect application of the fertilizing material to every particle of the seed as the latter is dropped to the ground.

When the machine is employed to plant corn in rows the openings $B^4$ $B^5$ in the ends of the rollers are employed.

The slides $b'$ are so constructed that they close the openings in the hoppers through which the corn is dropped when the openings for wheat or other smaller grain are opened, and vice versa.

$B^6$ are concave shields fixed in the casing A and fitting snugly to the peripheries of the rollers B $B'$. They are set in a vertical position, and extend from a point above the rollers and near the seed-openings around to the under side of said rollers, and their under edges form one of the sides of the openings through which the seed and fertilizer are dropped into the discharge-spout $c$. These shields serve as rubbers or cut-offs, to prevent more than the requisite quantity of seed or fertilizer from being carried over by the rollers.

$B^7$ is a conical-shaped shield placed below and between the rollers, its point extending upward near to the point where the peripheries of said rollers touch each other. This under shield forms the inner sides of the discharge-openings from the rollers into the discharge-spout. In drilling small grains it often happens that many of the kernels stick in the openings in the rollers and are carried beyond the discharge-opening before they drop out. In my device such retained seed will be prevented from dropping out and will be held in the openings till the roller has made nearly a quarter of a revolution, and the seed will then be carried around and be dropped in the next revolution. The seed carried past the discharge-opening is thus prevented from falling back and from being broken by getting between the roller and its casing.

$c$ is the discharge-spout, which receives the grain and fertilizer and conveys both of the latter to the boot of the drill-tooth.

The roll $B'$ has on one end of its shaft the gear-wheel $c'$, arranged to mesh with a pinion, $c^2$, which in turn meshes with a gear, $a^4$, fixed on the hub of the wheel $a^3$. The pinion $c^2$ is journaled on a crank-lever mechanism, $c^4$ $c^5$ $c^6$, so that it can be easily engaged with or disengaged from the gears $c'$ and $c^4$. By means of this adjustable pinion $c^2$ the planting may be continued or discontinued at the will of the driver.

D is the beam which carries the drill-tooth. It is composed of two nearly parallel arms, which have their forward ends united together at or near the pivotal end E.

$D'$ is the vertical standard, which is pivoted between the rear ends of the parallel arms, and so that its upper end projects above the beam.

$D^2$ is a brace, one end of which is connected to the upper end of the standard, and its other end is extended forward and downward and is made fast by a wooden pin, $D^3$, between the parallel arms.

The boot $D^4$ is fastened to the rear side of the standard, so that it turns back with the latter. When the shovel F strikes an obstruction the brace $D^2$ is pushed forward, the pin $D^3$ is broken, and the lower end of the standard, with its boot and shovel, is turned back.

In Figs. 7, 8, and 9 I have shown an improved plow. It consists in hinging to the main beam D, hereinbefore described, two supplemental or lateral beams, $g$ $g$. Each of these beams is constructed like the beam D and carries a shovel-standard, $g'$, and brace $g^2$, similar to the arrangement of the standard $D'$ and brace $D^2$. The supplemental or lateral beams are hinged to the side of the main beam D, and are bent slightly outward and extend to the rear of the standard $D'$. They have a vertical motion on their pivots $g^3$. Their forward ends engage under pins $g^4$ projecting from the side of the main beam, and prevent the shovels $g^5$ from dropping too low down. By this construction of a drill-plow I am enabled to cover the grain with greater certainty. The main drill-shovel F can be set to open a very shallow furrow, and the grain dropped therein will be covered by the supplemental plows $g^5$. The supplemental beams may be made rigid in their attachment to the main beam; but I prefer to hinge them, so that they will have a vertical movement independent of said main beam and of each other, and thus more readily adapt themselves to inequalities in the surface of the ground and pass more easily and safely over obstructions. One or both of the supplemental beams may be removed.

It will be often found sufficient to employ but one of the supplemental beams and plows, sufficient earth being thrown thereby over the seed dropped in the furrow opened by the main shovel F.

Having thus described my invention, what I claim, and desire to secure by Letters Patent, is—

1. In a seeding-machine, the combination, substantially as hereinbefore set forth, of the rollers B $B'$, placed in the casing A, with their peripheries touching each other, the hopper $A'$, located immediately above and having its seed-openings arranged slightly in rear of a vertical line drawn through the center of the roller B, the hopper $A^2$, located immediately above and having its seed-openings in advance of a vertical line drawn through the center of the roller B, the concave shields $B^6$, inclosing the front of roller $B'$ and rear of roller B, and the under shield, $B^7$, extending upward between the rollers, substantially as set forth.

2. In a machine for planting seed and distributing fertilizing material, the combination of the roller B, having a series of circumferential grooves or channels, and the feed-roller $B'$, journaled in the casing A, with its periphery touching the periphery of the other roller, B, and having seed-openings arranged in a series of circumferential rows and in sets, each set being placed opposite one of the circumferential grooves in the roller B, and revolved simultaneously with and in the opposite direction from the latter, substantially as set forth.

3. The improved drill-plow, consisting of a central beam provided with a standard and shovel, and a supplemental beam having its forward end fixed to the side of the main beam and its other end extended to the rear past the end of the main beam, and provided with a standard and shovel, substantially as set forth.

4. The combination, with the main beam D, provided with stop-pins $g^4$, of the supplemental beams or plows $g\ g$, hinged or pivoted to and having a vertical movement independent of the main beam or plow, substantially as set forth.

In testimony whereof I affix my signature in presence of two witnesses.

TILGHMAN A. FORD.

Witnesses:
 JAMES M. PETERS,
 J. R. DOTY.